(12) United States Patent
Wakisaka et al.

(10) Patent No.: US 9,475,343 B2
(45) Date of Patent: Oct. 25, 2016

(54) WHEEL BEARING DEVICE

(71) Applicant: JTEKT CORPORATION, Osaka-shi, Osaka (JP)

(72) Inventors: Teruyuki Wakisaka, Nagoya (JP); Kazuki Takamatsu, Hamamatsu (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/515,827

(22) Filed: Oct. 16, 2014

(65) Prior Publication Data

US 2015/0110432 A1 Apr. 23, 2015

(30) Foreign Application Priority Data

Oct. 23, 2013 (JP) .................................. 2013-220081

(51) Int. Cl.
*B60B 27/00* (2006.01)
*F16C 19/38* (2006.01)
*F16C 33/78* (2006.01)
*F16J 15/32* (2016.01)
*F16C 33/80* (2006.01)

(52) U.S. Cl.
CPC ....... *B60B 27/0073* (2013.01); *F16C 33/7876* (2013.01); *F16C 33/805* (2013.01); *F16J 15/3232* (2013.01); *F16C 19/386* (2013.01); *F16C 33/7886* (2013.01); *F16C 2326/02* (2013.01)

(58) Field of Classification Search
CPC ......... F16J 15/3232; F16C 33/7869–33/7886; F16C 33/7803; F16C 33/7813; F16C 33/7816; F16C 33/782; F16C 33/7826; F16C 33/783; F16C 33/80; F16C 33/805; F16C 2326/02; F16C 19/184–19/187; F16C 19/386; B60B 27/0073
See application file for complete search history.

(56) References Cited

U.S. PATENT DOCUMENTS

| 6,634,648 | B1 * | 10/2003 | Rockwell ....................... 277/572 |
| 8,915,651 | B2 * | 12/2014 | Masuda et al. ............... 384/544 |
| 8,979,385 | B2 * | 3/2015 | Haepp et al. ................. 384/480 |
| 2007/0076994 | A1 * | 4/2007 | Norimatsu et al. ........... 384/486 |
| 2012/0007316 | A1 * | 1/2012 | Terasawa ...................... 277/361 |
| 2012/0177315 | A1 * | 7/2012 | Matsuki et al. ............... 384/478 |
| 2013/0241270 | A1 * | 9/2013 | Morita .......................... 301/110 |
| 2014/0029883 | A1 * | 1/2014 | Sanaka et al. ................ 384/486 |

FOREIGN PATENT DOCUMENTS

| EP | 2 636 915 A1 | 9/2013 |
| JP | A-2008-45673 | 2/2008 |
| JP | 2011-117529 A | 6/2011 |

OTHER PUBLICATIONS

Apr. 2, 2015 Extended Search Report issued in European Application No. 14 18 9935.1.

* cited by examiner

*Primary Examiner* — Alan B Waits
(74) *Attorney, Agent, or Firm* — Oliff PLC (57) ABSTRACT

A sealing device includes a core metal that is fitted to the outer ring, and a sealing member that is fixed to the core metal. The core metal has a cylindrical portion that is fitted to the inner periphery of an end portion of the outer ring, an outer annular portion, and an inner annular portion. The sealing member has a covering portion that covers the outer annular portion and the cylindrical portion, and a space is formed between the covering portion and the flange. The sealing member further has an inner lip portion, and an outer lip portion. The covering portion has a deformed portion used to enlarge the space to suppress stagnation of water in the space.

6 Claims, 4 Drawing Sheets

WHEEL BEARING DEVICE

INCORPORATION BY REFERENCE

The disclosure of Japanese Patent Application No. 2013-220081 filed on Oct. 23, 2013 including the specification, drawings and abstract, is incorporated herein by reference in its entirety.

BACKGROUND OF THE INVENTION

1. Field of the Invention

The invention relates to a wheel bearing device.

2. Description of the Related Art

A wheel bearing device for fitting a tire wheel and a brake disc is used in a vehicle such as an automobile. The wheel bearing device includes an inner ring, an outer ring, rolling elements, and a sealing device (refer to, for example, Japanese Patent Application Publication No. 2008-45673 (JP 2008-45673 A)). The inner ring has a flange. The outer ring is disposed radially outward of the inner ring and is fixed to a vehicle body-side member. The rolling elements are disposed between the inner ring and the outer ring. The sealing device prevents foreign matter from entering the inside of a bearing where the rolling elements are disposed. The sealing device has a lip portion. The lip portion is in sliding contact with a part (seal face) of a side face of the flange. The wheel bearing device is used in an environment where foreign matter may adhere to the wheel bearing device. Examples of the foreign matter include rainwater and muddy water containing a snow melting agent used in a cold region. Thus, the sealing device is required to have high reliability and durability so that no rust is formed on, for example, raceway surfaces in the bearing.

In the sealing device described in JP 2008-45673 A, a clearance is formed between an end portion of the outer ring and the flange of the inner ring. Water (rainwater or muddy water) may be retained and stagnate in the clearance due to surface tension. The stagnation of the water in the clearance is likely to occur at a bottom portion of the wheel bearing device in a state where the vehicle is stopped and rotation of the inner ring is stopped. When the water stagnates as described above, rust is formed on the flange and the rust ultimately spreads to the seal face. In this case, when the inner ring rotates with the wheel, the lip portion that is in sliding contact with the seal face becomes significantly worn and the sealing function of the lip portion is reduced to cause water leakage. As a result, the water reaches the raceway surfaces on which the rolling elements (e.g., rollers and balls) roll and rust is formed on the raceway surfaces, and thus noise and vibration occur as the inner ring rotates.

Figure 4:
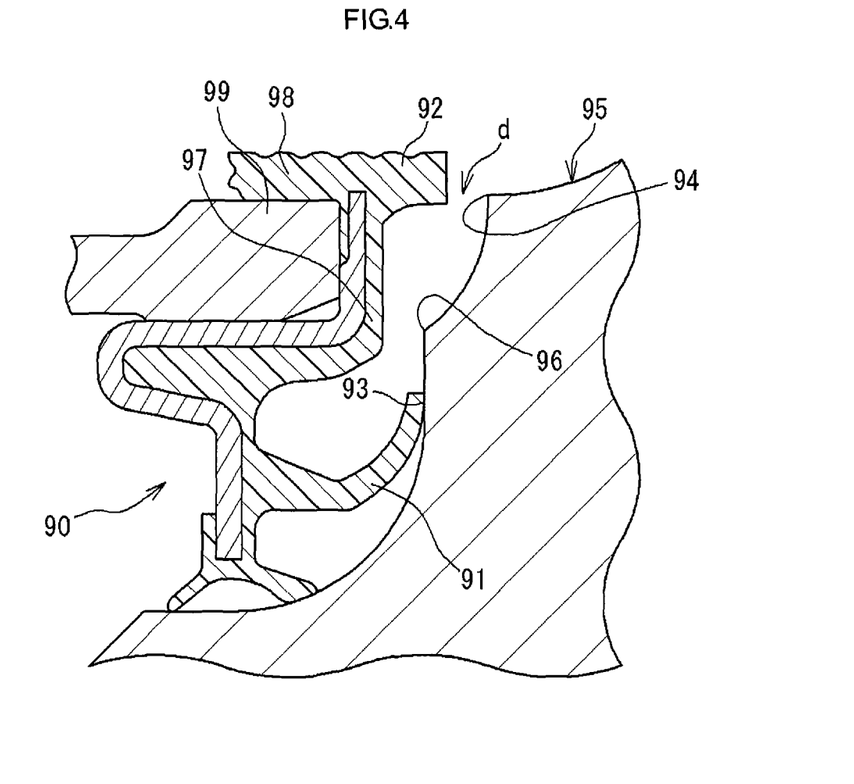
FIG. 4 is an axial sectional view illustrating a conventional sealing device and its surroundings.

Thus, there is a sealing device (deflector seal) 90 including a second lip portion 92 in addition to a first lip portion 91 that is in sliding contact with a part (seal face 93) of a flange 95 as illustrated in FIG. 4. The second lip portion 92 forms a small clearance d in cooperation with the flange 95 to constitute a labyrinth seal, thereby suppressing entry of the water.

As illustrated in FIG. 4, an inflection portion (edge) 96 is formed between the inner seal face 93 with which the first lip portion 91 is in sliding contact and an outer seal face 94 that forms the clearance d in cooperation with the second lip portion 92. The inflection portion 96 is close to a portion 97 of the sealing device 90. In addition, the region in which the portion 97 of the sealing device 90 and a part of the inner seal face 93 face each other in parallel is long. In this case, if even a small amount of water enters the inside of a bearing from the second lip portion 92, the water that has entered the inside of the bearing is retained and stagnates, due to the surface tension, between the portion 97 of the sealing device 90 and the inflection portion 96, and rust is likely to be formed on the inflection portion 96 and a region in the vicinity of the inflection portion 96.

The region where rust is formed is close to the inner seal face 93. Thus, as in the case of JP 2008-45673 A, the rust ultimately spreads to the inner seal face 93, and the first lip portion 91 that is in sliding contact with the seal face 93 is significantly worn as the inner ring rotates. Then, the function of the lip portion 91 is reduced and thus water leakage occurs. As a result, the water reaches the raceway surfaces of the wheel bearing device, on which rolling elements (e.g., rollers and balls) roll, and the rust is formed on the raceway surfaces. Consequently, noise and vibration occurs as the inner ring rotates, which may reduce the service life of the wheel bearing device.

SUMMARY OF THE INVENTION

One object of the invention is to provide a wheel bearing device including a sealing device configured to suppress reduction of the service life of the wheel bearing device.

A wheel bearing device includes: an inner ring having a flange; an outer ring located radially outward of the inner ring; rolling elements disposed between the inner ring and the outer ring; and a sealing device that prevents foreign matter from entering an inside of a bearing, in which the rolling elements are located. The sealing device includes a core metal that is fitted to the outer ring, and a sealing member that is fixed to the core metal. The core metal has a cylindrical portion that is fitted to an inner periphery of an end portion of the outer ring, an outer annular portion that extends radially outward from the cylindrical portion and that is brought into contact with an end face of the outer ring, and an inner annular portion that extends radially inward from the cylindrical portion. The sealing member has a covering portion that covers a flange side-portion of the outer annular portion and an inner peripheral side portion of the cylindrical portion, and a space is formed between the covering portion and a side face of the flange. The sealing member further has an inner lip portion that extends from the inner annular portion toward the flange and is in sliding contact with an inner seal face of the flange, and an outer lip portion that extends from the outer annular portion toward the flange. A small clearance is formed between the outer lip portion and an outer seal face of the flange. The covering portion has a deformed portion used to enlarge the space to suppress stagnation of water in the space.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
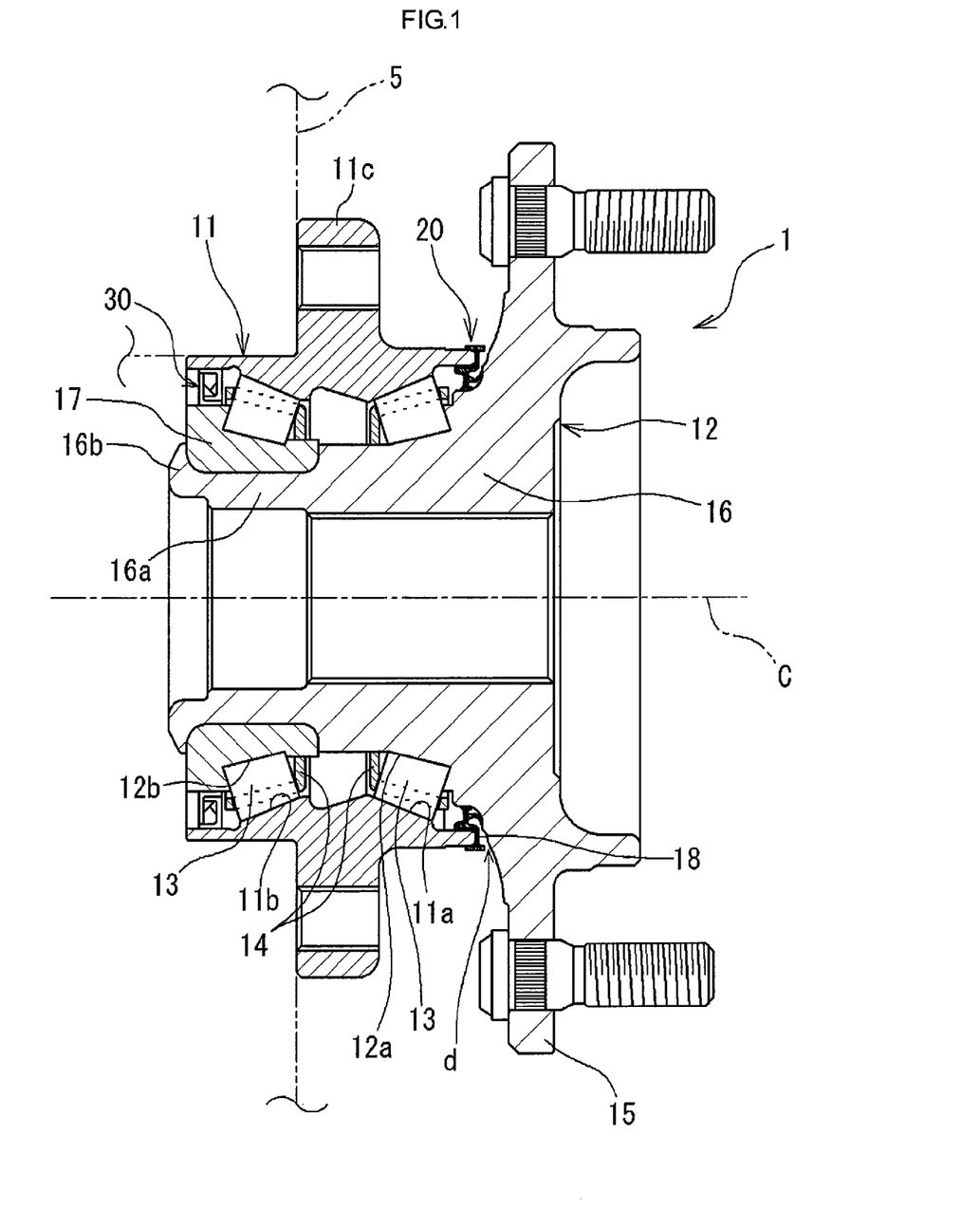
FIG. 1 is an axial sectional view illustrating a wheel bearing device according to an embodiment of the invention.

Hereinafter, example embodiments of the invention will be described with reference to accompanying drawings. FIG. 1 is an axial sectional view illustrating a wheel bearing device 1 according to an embodiment of the invention. The wheel bearing device 1 is attached to a suspension 5 fitted to a vehicle body of, for example, an automobile, and supports a tire wheel (not illustrated) and a brake disc (not illustrated) such that the tire wheel and the brake disc are rotatable relative to the suspension 5. The wheel bearing device 1 includes an outer ring 11, an inner ring 12, a plurality of rollers 13 (rolling elements), and cages 14. The rollers 13 are disposed between the outer ring 11 and the inner ring 12. Each of the cages 14 holds the rollers 13. In the present embodiment, the rolling elements are the tapered rollers 13, and the wheel bearing device 1 is configured to include a double row tapered roller bearing.

The outer ring 11 is a tubular member that is disposed radially outward of the inner ring 12, and serves as a fixed ring when fixed to the suspension 5. Outer ring raceways 11a, 11b are formed on the inner peripheral face of the outer ring 11. A fitting flange 11c that is fixed to the suspension 5 is formed on the outer periphery of the outer ring 11. The inner ring 12 is a shaft member (a hollow shaft member in the present embodiment) that has a flange 15 extending radially outward, and is disposed so as to be concentric with the outer ring 11. An inner ring main body 16, which is a part of the inner ring 12, is positioned radially inward of the outer ring 11, and the inner ring 12 serves a rotary ring that rotates relative to the outer ring 11. Inner ring raceways 12a, 12b that face the outer ring raceways 11a, 11b are formed on the outer peripheral face of the inner ring 12. The rollers 13 are disposed so as to be rollable between the outer ring raceways 11a, 11b and the inner ring raceways 12a, 12b. The rollers 13 are held by the cages 14 so as to be arranged at prescribed intervals in the circumferential direction.

The flange 15, to which the tire wheel (not illustrated) and the brake disc (not illustrated) are fitted, is formed at one end side (the right side in FIG. 1) of the inner ring 12 in the axial direction. An axial clearance d is formed between the flange 15 and an axial end portion 18 of the outer ring 11. The clearance d opens toward the outside in the radial direction (radially outward).

The inner ring 12 is formed by combining the inner ring main body 16 with a ring member 17. The first inner ring raceway 12a is formed on the outer peripheral face of the inner ring main body 16. The flange 15 is formed integrally with the inner ring main body 16 at one end side of the inner ring main body 16 in the axial direction. A small-diameter portion 16a having a diameter smaller than that of the inner ring raceway 12a is formed at the other end side of the inner ring main body 16 in the axial direction. The ring member 17 is an annular member, and the second inner ring raceway 12b is formed on the outer peripheral face of the ring member 17. The ring member 17 is fitted onto the small-diameter portion 16a. The ring member 17 is fixed by a clinched portion 16b that is formed at the other end portion of the inner ring main body 16, and the ring member 17 and the inner ring main body 16 are fixedly fitted to each other.

An annular space is formed between the outer ring 11 and the inner ring 12, and the rollers 13 are disposed in the annular space. A sealing device 20 is disposed on one side of the annular space in the axial direction, and a sealing device 30 is disposed on the other side of the annular space in the axial direction. The sealing devices 20, 30 prevent foreign matter from entering the inside of the bearing where the rollers 13 in the annular space are disposed. Examples of the foreign matter include rainwater and muddy water containing a snow melting agent used in a cold region. Because the sealing device 20 disposed in the clearance d between the outer ring 11 and the flange 15 of the inner ring 12 is positioned outside the vehicle body and is close to the tire wheel, water such as rainwater or muddy water is likely to adhere to the sealing device 20. Thus, in particular, the sealing device 20 is required to have high reliability and durability so that rust is not formed on, for example, the raceways (11a, 11b, 12a, 12b) inside the bearing.

Figure 2:
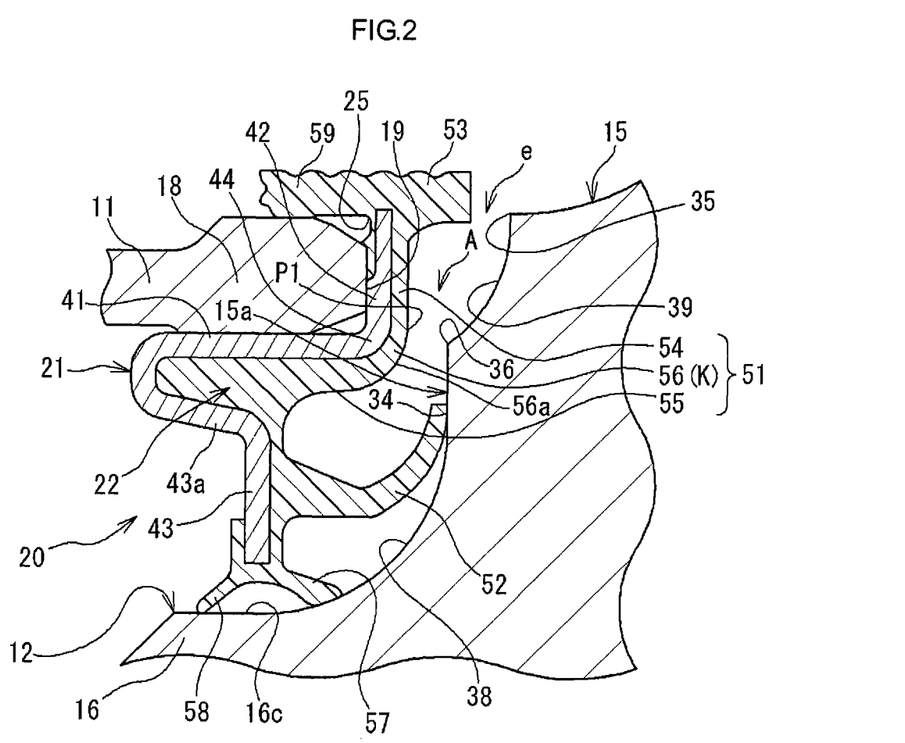
FIG. 2 is an axial sectional view illustrating a first example of a sealing device and its surroundings.

FIG. 2 is an axial sectional view illustrating the sealing device 20 and its surroundings. A side face 15a of the flange 15 has seal faces 34, 35 that are used to block entry of foreign matter in cooperation with lip portions 52, 53 (described later), at a base portion of the flange 15. The inner seal face 34 located radially inward of the outer seal face 35 is continuous via a circular arc face 38 from an outer peripheral face 16c of the inner ring main body 16. The inner seal face 34 has such a shape that an annular plane orthogonal to a bearing center line C (refer to FIG. 1) is included in at least a part of the inner seal face 34. The outer seal face 35 located radially outward of the inner seal face 34 is included in a concave face 39 that has such a shape as to be gradually separated in the axial direction from an end face 19 of the outer ring 11 as the concave face 39 extends radially outward. The outer seal face 35 is formed of a part (radially outer edge) of the concave face 39. An inflection portion 36 is formed between the inner seal face 34 and the concave face 39. The inflection portion 36 is a sharp edge portion that protrudes toward the outer ring 11. The inflection portion 36 is formed at a position (end portion) reached by extending the inner seal face 34 radially outward. The inflection portion 36 is located at a position close to the inner lip portion 52 that is in sliding contact with the inner seal face 34.

A first example of the sealing device 20 will be described below. As illustrated in FIG. 2, the sealing device (deflector seal) 20 includes an annular core metal 21 and an annular sealing member 22. The core metal 21 is fitted to the outer ring 11. The sealing member 22 is fixed to the core metal 21. The core metal 21 is formed to have a prescribed sectional shape by performing press working on, for example, a steel sheet, and has a cylindrical portion 41, an outer annular portion 42, and an inner annular portion 43. The cylindrical portion 41 has a cylindrical shape, and is fitted to the inner periphery of the end portion 18 of the outer ring 11. The outer annular portion 42 is a part that has an annular shape, extends radially outward from the cylindrical portion 41, and is brought into contact with the end face 19 of the outer ring 11 in the axial direction. In the present example, the outer annular portion 42 is connected to one end portion of the cylindrical portion 41 and extends radially outward. The cylindrical portion 41 and the outer annular portion 42 are continuous with each other via a circular arc-shaped bent portion 44. The inner annular portion 43 has an annular shape, and extends radially inward from the cylindrical portion 41. In the present example, the inner annular portion 43 is connected to the other end portion of the cylindrical portion 41 and extends radially inward. The inner annular portion 43 has a curved portion 43a and extends radially inward.

The sealing member 22 is obtained by forming an elastic body such as nitrile rubber into an annular shape, and is fixed to the core metal 21 through, for example, cure adhesion. The sealing member 22 has a covering portion 51, the inner lip portion 52, and the outer lip portion (first outer lip portion) 53. The sealing member 22 further has radial lip portions 57, 58, and a second outer lip portion 59. The sealing member 22 is a single-piece member having these portions.

The covering portion 51 is a part that has an annular shape, and covers the flange 15-side portion of the outer annular portion 42 of the core metal 21, the inner peripheral side portion of the circular arc-shaped bent portion 44, and the inner peripheral side portion of the cylindrical portion 41. A space A that has an annular shape is formed between the surface of the covering portion 51 and the side face 15a of the flange 15. The covering portion 51 has an annular outer covering portion 54, a cylindrical inner periphery covering portion 55, and an intermediate covering portion 56. The outer covering portion 54 is a part that covers the flange 15-side portion of the outer annular portion 42. The inner periphery covering portion 55 is a part that covers the inner peripheral side of the cylindrical portion 41. The intermediate covering portion 56 is a part that is formed between the outer covering portion 54 and the inner periphery covering portion 55, and covers the circular arc-shaped bent portion 44 of the core metal 21. The outer covering portion 54 covers a part of the outer ring 11-side portion of the outer annular portion 42, and a part of the outer covering portion 54, which covers the outer ring 11-side portion of the outer annular portion 42, is in contact with the end face 19 of the outer ring 11.

The inner lip portion 52 extends from the inner annular portion 43 toward the flange 15, and is in contact with the inner seal face 34 of the flange 15. Thus, the inner lip portion 52 is in sliding contact with the inner seal face 34 as the inner ring 12 rotates. Entry of foreign matter into the bearing is prevented by the inner lip portion 52. A part of the inner lip portion 52 may be in contact (sliding contact) with a part of the circular arc face 38.

The radial lip portion 57 extends toward the inner ring 12 from a radially inner end portion of the inner annular portion 43, and is in contact (sliding contact) with the vicinity (the circular arc face 38) of the boundary between the outer peripheral face 16c of the inner ring main body 16 and the side face 15a of the flange 15. The radial lip portion 58 extends toward the inner ring 12 from the radially inner end portion of the inner annular portion 43, and is in contact (sliding contact) with the outer peripheral face 16c of the inner ring main body 16. Entry of foreign matter (water) into the bearing is further reliably prevented by the radial lip portions 57, 58.

The first outer lip portion 53 extends toward the flange 15 from a radially outer end portion of the outer annular portion 42, and forms a small clearance e in cooperation with the outer seal face 35 of the flange 15. The small clearance e constitutes a labyrinth seal so that entry of foreign matter (water) is prevented. The second outer lip portion 59 extends in a direction away from the flange 15 from the radially outer end portion of the outer annular portion 42, and is in contact with the outer peripheral face of the end portion 18 of the outer ring 11. Entry of foreign matter (water) into a space between the end portion 18 of the outer ring 11 and the core metal 21 (the outer annular portion 42) is prevented by the second outer lip portion 59.

The covering portion 51 has a deformed portion K, which is used to enlarge the space A, to suppress stagnation of water (foreign matter containing water), due to surface tension, in the space A between the surface of the covering portion 51 and the side face 15a of the flange 15. In the example illustrated in FIG. 2, the deformed portion K is the intermediate covering portion 56 that has a circular arc shape, which is convex toward the flange 15, in a surface 56a. A starting point P1 of the circular arc shape of the surface 56a of the intermediate covering portion 56, the starting point P1 being on the outer covering portion 54 side, is positioned radially outward of the inflection portion 36. Alternatively, the starting point P1 of the circular arc shape may be at the same position as the inflection portion 36 in the radial direction.

As described above, the outer covering portion 54-side starting point P1 of the circular arc shape of the intermediate covering portion 56 is positioned radially outward of the inflection portion 36 (or is at the same position as the inflection portion 36 in the radial direction). Thus, the space A that is formed between the covering portion 51 and the flange 15 is enlarged in a direction toward the radially inside, within a range including the inflection portion 36. In other words, in the present example, the intermediate covering portion 56 of the covering portion 51 serves as the deformed portion K, and the space A is enlarged by the intermediate covering portion 56 (the deformed portion K).

Thus, even when water enters the inside of the bearing from the small clearance e between the outer lip portion 53 and the flange 15 (the outer seal face 35), in particular, in a state where rotation of the inner ring 12 is stopped, stagnation of the water in the space A due to the surface tension is suppressed because the space A is enlarged. In particular, the surface 56a of the intermediate covering portion 56, which has a circular arc shape, is not in parallel to the inner seal face 34 that is orthogonal to the bearing center line C (refer to FIG. 1) and does not face the inner seal face 34, and thus stagnation of water due to the surface tension is effectively suppressed at the inflection portion 36 and the vicinity of the inflection portion 36. As a result, formation of rust on the flange 15 due to stagnation of water in the space A is prevented, so that the rust does not spread to the inner seal face 34 unlike in the related art and the rust is not formed on the inner seal face 34. Therefore, damage to the inner lip portion 52 that is in sliding contact with the inner seal face 34 is prevented, so that the service life of the sealing device 20 is increased. As a result, reduction in the service life of the wheel bearing device 1 is suppressed.

Figure 3:
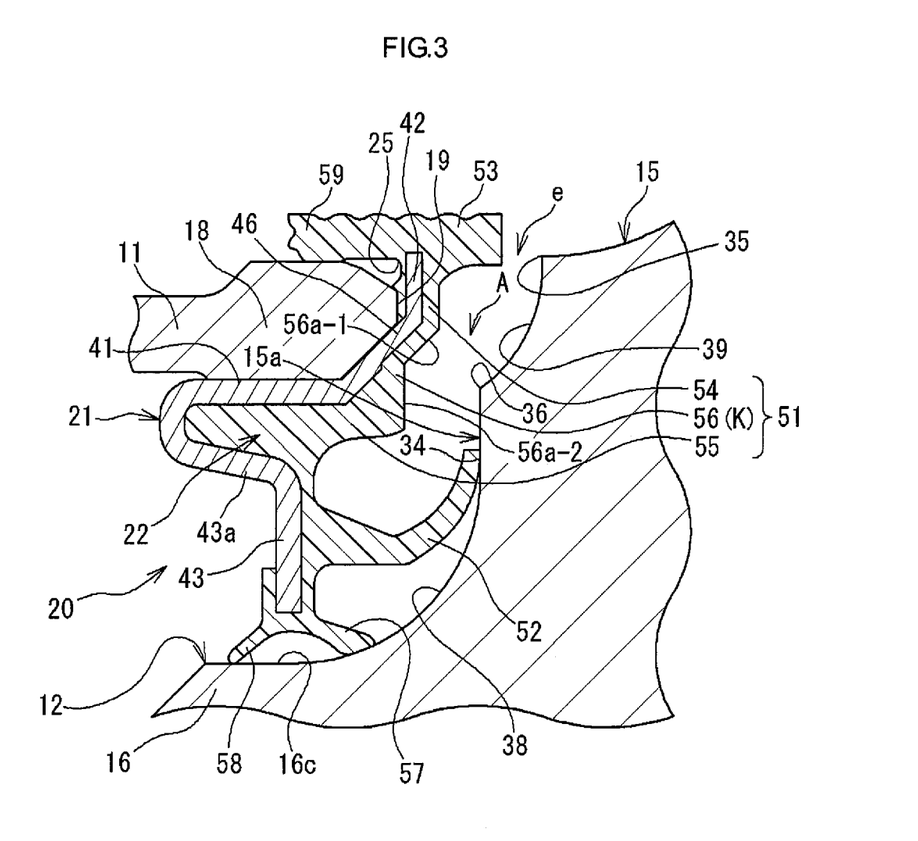
FIG. 3 is an axial sectional view illustrating a second example of a sealing device and its surroundings.

A second example of a sealing device 20 will be described below. FIG. 3 is an axial sectional view illustrating the second example of the sealing device 20 and its surroundings. The sealing device 20 illustrated in FIG. 3 and the sealing device 20 illustrated in FIG. 2 are different from each other only in the deformed portion K and a part of the core metal 21, and the other configurations are the same.

The sealing device 20 illustrated in FIG. 3 also has an annular core metal 21, and an annular sealing member 22. The core metal 21 is fitted to the outer ring 11. The sealing member 22 is fixed to the core metal 21. The core metal 21 is formed to have a prescribed sectional shape by performing press working on, for example, a steel sheet, and has a cylindrical portion 41, an outer annular portion 42, and an inner annular portion 43. The core metal 21 has a tapered portion 46 instead of the circular arc-shaped bent portion 44 of the core metal 21 of the sealing device 20 illustrated in FIG. 2. The tapered portion 46 is a tapered cylindrical portion the diameter of which is increased (is linearly changed) along the axial direction.

The cylindrical portion 41 has a cylindrical shape, and is fitted to the inner periphery of the end portion 18 of the outer ring 11. The outer annular portion 42 is a part that has an annular shape, extends radially outward from the cylindrical portion 41, and is brought into contact with the end face 19 of the outer ring 11 in the axial direction. The outer annular portion 42 is connected to one end portion of the cylindrical portion 41 via the tapered portion 46, and extends radially outward. That is, the cylindrical portion 41 and the outer annular portion 42 are continuous with each other via the tapered portion 46. The inner annular portion 43 has an annular shape, and extends radially inward from the cylindrical portion 41. In the present example, the inner annular portion 43 is connected to the other end portion of the cylindrical portion 41 and extends radially inward. The inner annular portion 43 has a curved portion 43a and extends radially inward.

The sealing member 22 is obtained by forming an elastic body such as nitrile rubber into an annular shape, and is fixed to the core metal 21 through, for example, cure adhesion. The sealing member 22 has a covering portion 51, an inner lip portion 52, and an outer lip portion (first outer lip portion) 53. The sealing member 22 further has radial lip portions 57, 58, and a second outer lip portion 59. The sealing member 22 is a single-piece member having these portions.

The covering portion 51 is a part that has an annular shape, and covers the flange 15-side portion of the outer annular portion 42, the inner peripheral side portion of the tapered portion 46, and the inner peripheral side portion of the cylindrical portion 41. A space A that has an annular shape is formed between the surface of the covering portion 51 and the side face 15a of the flange 15. The covering portion 51 has an annular outer covering portion 54, a cylindrical inner periphery covering portion 55, and an intermediate covering portion 56. The outer covering portion 54 is a part that covers the flange 15-side portion of the outer annular portion 42. The inner periphery covering portion 55 is a part that covers the inner peripheral side of the cylindrical portion 41. The intermediate covering portion 56 is a part that is formed between the outer covering portion 54 and the inner periphery covering portion 55, and covers the tapered portion 46 of the core metal 21. The outer covering portion 54 covers a part of the outer ring 11-side portion of the outer annular portion 42, and a part of the outer covering portion 54, which covers the outer ring 11-side portion of the outer annular portion 42, is in contact with the end face 19 of the outer ring 11.

The inner lip portion 52 extends from the inner annular portion 43 toward the flange 15, and is in contact with the inner seal face 34 of the flange 15. Thus, the inner lip portion 52 is in sliding contact with the inner seal face 34 as the inner ring 12 rotates. Entry of foreign matter into the bearing is prevented by the inner lip portion 52. A part of the inner lip portion 52 may be in contact (sliding contact) with a part of the circular arc face 38.

The radial lip portion 57 extends toward the inner ring 12 from a radially inner end portion of the inner annular portion 43, and is in contact (sliding contact) with the vicinity (the circular arc face 38) of the boundary between the outer peripheral face 16c of the inner ring main body 16 and the side face 15a of the flange 15. The radial lip portion 58 extends toward the inner ring 12 from the radially inner end portion of the inner annular portion 43, and is in contact (sliding contact) with the outer peripheral face 16c of the inner ring main body 16. Entry of foreign matter (water) into the bearing is further reliably prevented by the radial lip portions 57, 58.

The first outer lip portion 53 extends toward the flange 15 from a radially outer end portion of the outer annular portion 42, and forms a small clearance e in cooperation with the outer seal face 35 of the flange 15. The small clearance e constitutes a labyrinth seal so that entry of foreign matter (water) is prevented. The second outer lip portion 59 extends in a direction away from the flange 15 from the radially outer end portion of the outer annular portion 42, and is in contact with the outer peripheral face of the end portion 18 of the outer ring 11. Entry of foreign matter (water) into a space between the end portion 18 of the outer ring 11 and the core metal 21 (the outer annular portion 42) is prevented by the second outer lip portion 59.

The covering portion 51 has a deformed portion K, which is used to enlarge the space A, to suppress stagnation of water (foreign matter containing water), due to surface tension, in the space A between the surface of the covering portion 51 and the side face 15a of the flange 15. In the example illustrated in FIG. 3, the deformed portion K is the intermediate covering portion 56 that has, on its surface, a tilted face 56a-1, which is tilted so as to be away from the side face 15a of the flange 15 in a direction toward the inside in the radial direction. The surface of the intermediate covering portion 56 has an annular face 56a-2, which is in parallel to and faces the side face 15a (the inner seal face 34) of the flange 15 in addition to the tilted face 56a-1.

As described above, the intermediate covering portion 56 has, on its surface, the tilted face 56a-1, tilted so as to be away from the flange 15 in a direction toward the inside in the radial direction, and thus the distance between the annular face 56a-2 that is continuous from the tilted face 56a-1 on the surface of the intermediate covering portion 56 and the side face 15a (the inner seal face 34) of the flange 15 is made greater than that in the related art (refer to FIG. 4). That is, with the tilted face 56a-1 and the annular face 56a-2, the space A that is formed between the side face 15a of the flange 15 and the covering portion 51 is enlarged in a direction toward the inside in the radial direction. In other words, in the present example, the intermediate covering portion 56, which has, on its surface, the tilted face 56a-1 tilted so as to be away from the side face 15a of the flange 15 in a direction toward the inside in the radial direction, serves as the deformed portion K, and the space A is enlarged by the intermediate covering portion 56 (the deformed portion K).

Thus, even when water enters the inside of the bearing from the small clearance e between the outer lip portion 53 and the flange 15 (the outer seal face 35), in particular, in a state where rotation of the inner ring 12 is stopped, stagnation of the water in the space A due to the surface tension is suppressed because the space A is enlarged. The distance between the annular face 56a-2 of the intermediate covering portion 56 and the inner seal face 34 in the axial direction is greater than the length of the small clearance e between the first outer lip portion 53 and the outer seal face 35. For example, the minimum distance between the annular face 56a-2 and the inner seal face 34 is approximately 1.5 to 2 millimeters. With such a distance, retention and stagnation of the water due to the surface tension is suppressed. As a result, formation of rust on the flange 15 due to stagnation of water in the space A is prevented, so that the rust does not spread to the inner seal face 34 unlike in the related art and the rust is not formed on the inner seal face 34. Therefore, damage to the inner lip portion 52 that is in sliding contact with the inner seal face 34 is prevented, so that the service life of the sealing device 20 is increased. As a result, reduction in the service life of the wheel bearing device 1 is suppressed.

Other configurations will be described below. In each of the sealing device 20 illustrated in FIG. 2 and the sealing device 20 illustrated in FIG. 3, a circumferential groove 25 is formed at a position radially inward of a base portion of the second outer lip portion 59. An annular space (closed space) that is defined by the second outer lip portion 59, a part of the outer covering portion 54, which covers the outer ring 11-side portion of the outer annular portion 42, and the end portion 18 of the outer ring 11 is formed by the circumferential groove 25.

The circumferential groove 25 has the following function. In each of the example illustrated in FIG. 2 and the example illustrated in FIG. 3, the muddy water that is splashed from the wheel (not illustrated) fixed to the flange 15 or a vehicle body (not illustrated) side is guided along the outer peripheral face of the outer ring 11 and approaches the sealing member 22 (the second outer lip portion 59) in some cases. The muddy water may take such a path as to flow between the outer peripheral face of the outer ring 11 and the second outer lip portion 59, flow along the end face 19 of the outer ring 11 and the inner peripheral face of the outer ring 11, and reach the inside of the bearing. In other words, an inlet for the muddy water is between the second outer lip portion 59, which is a radially outermost rubber portion, and the outer peripheral face of the outer ring 11 and the path described above is formed, and thus rust is formed at the inlet, an intermediate portion of the path, or the inside of the bearing even when, for example, the first outer lip portion 53 is present. In the case where the circumferential groove 25 (as in the above-described examples) is not formed radially inward of a second outer lip portion 98 and the inner peripheral face of the second outer lip portion 98 is in complete close contact with the outer peripheral face of an end portion of an outer ring 99 so that no clearance is present as in an example of the related art illustrated in FIG. 4, when rust is formed on the outer peripheral face of the end portion of the outer ring 99 due to the water that has entered, the outer peripheral face expands radially outward as the rust develops to increase its thickness. In addition, when entry of foreign matter from the inlet becomes easier due to the formation of the rust and the foreign matter that has entered accumulates, the outer peripheral face side expands radially outward and the second outer lip portion 98 is pressed radially outward. In such a case, the second outer lip portion 98 is bent radially outward, and the second outer lip portion 98 is broken in some cases. However, in the above described examples (FIG. 2 and FIG. 3), the circumferential groove 25 that is recessed radially outward is formed at a position radially inward of the second outer lip portion 59, and thus the rust and foreign matter are accommodated in the circumferential groove 25. In other words, the circumferential groove 25 absorbs the expansion caused by the rust and foreign matter. The formation of the circumferential groove 25 prevents the second outer lip portion 59 from being pressed (pushed) radially outward even when the rust and foreign matter accumulate and expand in the space that is formed between the circumferential groove 25 and the outer peripheral face of the outer ring 11. Thus, abnormal deformation of the second outer lip portion 59 is prevented. The circumferential groove 25 may be recessed toward the flange 15 (in the axial direction) while being recessed radially outward. In the above-described examples, an end portion of the outer peripheral face of the outer ring 11 is chamfered, and the space that is formed by the circumferential groove 25 is enlarged through the chamfering.

In each of the sealing device 20 illustrated in FIG. 2 and the sealing device 20 illustrated in FIG. 3, the inner lip portion 52 is positioned radially inward of the end portion 18 of the outer ring 11, the outer lip portion 53 is positioned radially outward of the end portion 18 of the outer ring 11, and the lip portions 52, 53 are positioned so as to be apart from each other in the radial direction. Thus, the inner seal face 34 and the outer seal face 35 are also positioned so as to be apart from each other in the radial direction. Hence, even if water is retained and stagnate between the outer lip portion 53 and the outer seal face 35 in a state where rotation of the inner ring 12 is stopped and rust is formed on the outer seal face 35 due to the water, the rust is unlikely to reach the inner seal face 34 because the outer seal face 35 and the inner seal face 34 are positioned so as to be apart from each other in the radial direction. In addition, a distal end face of the first outer lip portion 53 does not entirely face the outer seal face 35, and only a part of the distal end face faces the outer seal face 35. Because the facing area is small as described above, the amount of the water that stagnates between the distal end face and the outer seal face 35 is minimized even if the water stagnates between the distal end face and the outer seal face 35.

The wheel bearing device 1 according to the invention is not limited to the illustrated embodiment, and may be implemented in other embodiments within the scope of the invention. For example, the rolling elements of the wheel bearing device 1 are the tapered rollers 13 in the above-described embodiment (FIG. 1). However, the rolling elements may be cylindrical rollers or balls.

With the wheel bearing device according to the invention, stagnation of water in the space formed between the side face of the flange and the covering portion due to, for example, the surface tension is suppressed even when the water enters the inside of the bearing from between the outer lip portion of the sealing device and the flange (the outer seal face). Thus, formation of rust on the flange due to stagnation of the water in the space is prevented, and formation of rust on the inner seal face is prevented. Hence, the damage to the inner lip portion that is in sliding contact with the inner seal face is prevented, and the service life of the sealing device is increased. As a result, reduction in the service life of the wheel bearing device is suppressed.

What is claimed is:

1. A wheel bearing device comprising:
   an inner ring having a flange;
   an outer ring located radially outward of the inner ring;
   rolling elements disposed between the inner ring and the outer ring; and
   a sealing device that prevents foreign matter from entering an inside of a bearing, in which the rolling elements are located,
   wherein:
   the sealing device includes a core metal that is fitted to the outer ring, and a sealing member that is fixed to the core metal,
   the core metal has a cylindrical portion that is fitted to an inner periphery of an end portion of the outer ring, an outer annular portion that extends radially outward from the cylindrical portion and that is brought into contact with an end face of the outer ring, and an inner annular portion that extends radially inward from the cylindrical portion,
   an end portion of the outer ring has a chamfered portion, wherein the chamfered portion has a corresponding shape with a corresponding portion of the outer annular portion,
   a space is provided between the end face of the outer ring and a vertically oriented portion of the outer annular portion,
   the sealing member has radial lip portions and a covering portion that covers a flange side-portion of the outer annular portion, an inner peripheral side portion of the cylindrical portion, a space being formed between the covering portion and a side face of the flange, the sealing member having an inner lip portion that extends from the inner annular portion toward the flange and is in sliding contact with an inner seal face of the flange, and an outer lip portion that extends from the outer annular portion toward the flange, a clearance being formed between the outer lip portion and an outer seal face of the flange, one of the radial lip portions extends toward the inner ring from a radially inner end portion of the inner annular portion, and is in contact with a vicinity of a boundary between an outer peripheral face of the inner ring main body and the side face of the flange, and the other radial lip portion extends toward the inner ring from the radially inner end portion of the inner annular portion, and is in contact with the outer peripheral face of the inner ring main body the clearance functions as a labyrinth seal and is configured so as to prevent entry of foreign water, and the covering portion has a curved portion to suppress stagnation of water in the space, the curved portion having a surface that has a circular arc shape convex toward the flange, wherein a starting point of the circular arc shape, on a side of the circular arc closest to an outer covering portion, is positioned radially outward from an inflection portion of the flange or at a same position as the inflection portion of the flange in the radial direction, the bent portion projecting in a direction toward a projection of the inflection portion.

2. The wheel bearing device according to claim 1, wherein:

the inflection portion is formed on the side face of the flange, at a position reached by extending, radially outward, the inner seal face including a plane orthogonal to a bearing center line; and the covering portion has an annular outer covering portion that covers the flange side-portion of the outer annular portion, a cylindrical inner periphery covering portion that covers the inner peripheral side portion of the cylindrical portion, and the intermediate covering portion located between the outer covering portion and the inner periphery covering portion.

3. The wheel bearing device according to claim 2, wherein:

a circumferential groove is formed at a position radially inward of the second outer lip portion.

4. The wheel bearing device according to claim 1, wherein:

the inflection portion is formed on the side face of the flange, at a position reached by extending, radially outward, the inner seal face including a plane orthogonal to a bearing center line;

the covering portion has an annular outer covering portion that covers the flange side-portion of the outer annular portion, a cylindrical inner periphery covering portion that covers the inner peripheral side portion of the cylindrical portion, and an intermediate covering portion located between the outer covering portion and the inner periphery covering portion; and the curved portion has a tilted face that is tilted so as to be away from the side face of the flange in a radially inward direction, the tilted face being formed on a surface of the intermediate covering portion.

5. The wheel bearing device according to claim 4, wherein:

a circumferential groove is formed at a position radially inward of the second outer lip portion.

6. The wheel bearing device according to claim 1, wherein:

a circumferential groove is formed at a position radially inward of the second outer lip portion.

* * * * *